US008549601B2

(12) United States Patent
Ganesan

(10) Patent No.: US 8,549,601 B2
(45) Date of Patent: Oct. 1, 2013

(54) METHOD FOR SECURE USER AND SITE AUTHENTICATION

(75) Inventor: Ravi Ganesan, Half Moon Bay, CA (US)

(73) Assignee: Authentify Inc., Chicago, IL (US)

( * ) Notice: Subject to any disclaimer, the term of this patent is extended or adjusted under 35 U.S.C. 154(b) by 122 days.

(21) Appl. No.: 13/006,806

(22) Filed: Jan. 14, 2011

(65) Prior Publication Data

US 2011/0179472 A1 Jul. 21, 2011

Related U.S. Application Data

(63) Continuation of application No. 12/938,161, filed on Nov. 2, 2010.

(60) Provisional application No. 61/257,207, filed on Nov. 2, 2009.

(51) Int. Cl.
*H04L 29/06* (2006.01)

(52) U.S. Cl.
USPC .................................... 726/8; 726/9

(58) Field of Classification Search
USPC ........................ 726/2–5, 8, 17–21
See application file for complete search history.

(56) References Cited

U.S. PATENT DOCUMENTS

| 8,136,148 B1 * | 3/2012 | Chayanam et al. ............... 726/5 |
| 8,225,102 B1 * | 7/2012 | Palmer et al. ................. 713/183 |
| 2002/0095507 A1 | 7/2002 | Jerdonek |
| 2003/0028451 A1 | 2/2003 | Ananian |
| 2004/0030924 A1 | 2/2004 | Mizoguchi et al. |
| 2004/0148510 A1 * | 7/2004 | Muller et al. ................. 713/186 |
| 2004/0210536 A1 | 10/2004 | Gudelj et al. |
| 2004/0225878 A1 | 11/2004 | Costa-Requena et al. |
| 2004/0242238 A1 | 12/2004 | Wang et al. |
| 2005/0039054 A1 * | 2/2005 | Satoh et al. .................. 713/201 |

(Continued)

FOREIGN PATENT DOCUMENTS

| JP | 11-338933 | 12/1999 |
| JP | 2002-259344 | 9/2002 |
| JP | 2005-209083 | 8/2005 |
| WO | WO 2007107868 A2 * | 9/2007 |

OTHER PUBLICATIONS

Gralla, P. How the Internet Works. 2006. Que, pp. 346-347.*

(Continued)

*Primary Examiner* — Oscar Louie
*Assistant Examiner* — Zhimei Zhu
(74) *Attorney, Agent, or Firm* — Antonelli, Terry, Stout & Kraus, LLP.

(57) ABSTRACT

User authentication is achieved by creating a window on the user's PC that is in communication with a security server, where this communication channel is separate from the communication channel between the user's browser and whichever web site they are at. A legitimate web site embeds code in the web page which communicates to the security server from the user's desktop. The security server signals both the web page on the user's browser and the window to which it has a separate channel. If user authentication is requested by the web site, the security server computes a one time password based on a secret which it shares with the web site, but not with the user, and which is not associated with any particular user, and the web site can re-compute the one time password to authenticate the user.

25 Claims, 2 Drawing Sheets

(56) References Cited

U.S. PATENT DOCUMENTS

| | | | |
|---|---|---|---|
| 2005/0135242 A1 | 6/2005 | Larsen et al. | |
| 2005/0172229 A1 | 8/2005 | Reno et al. | |
| 2005/0254653 A1 | 11/2005 | Potashnik et al. | |
| 2006/0168259 A1 | 7/2006 | Spilotro | |
| 2006/0168663 A1 | 7/2006 | Viljoen et al. | |
| 2006/0230268 A1* | 10/2006 | Muller et al. | 713/168 |
| 2006/0235795 A1 | 10/2006 | Johnson et al. | |
| 2006/0288230 A1* | 12/2006 | Crall et al. | 713/183 |
| 2007/0006291 A1* | 1/2007 | Barari et al. | 726/10 |
| 2007/0011724 A1 | 1/2007 | Gonzalez et al. | |
| 2007/0067828 A1* | 3/2007 | Bychkov | 726/3 |
| 2007/0074276 A1 | 3/2007 | Harrison et al. | |
| 2007/0079135 A1 | 4/2007 | Saito | |
| 2007/0143845 A1* | 6/2007 | Jeong et al. | 726/22 |
| 2007/0157304 A1 | 7/2007 | Logan et al. | |
| 2007/0174904 A1 | 7/2007 | Park | |
| 2007/0186095 A1 | 8/2007 | Ganesan et al. | |
| 2007/0198437 A1 | 8/2007 | Eisner et al. | |
| 2007/0279227 A1 | 12/2007 | Juels | |
| 2007/0283273 A1 | 12/2007 | Woods | |
| 2008/0028447 A1* | 1/2008 | O'Malley et al. | 726/6 |
| 2008/0034216 A1 | 2/2008 | Law | |
| 2008/0052180 A1 | 2/2008 | Lawhorn | |
| 2008/0109657 A1* | 5/2008 | Bajaj et al. | 713/168 |
| 2008/0120707 A1 | 5/2008 | Ramia | |
| 2008/0172730 A1 | 7/2008 | Sandhu et al. | |
| 2008/0254765 A1 | 10/2008 | Eliaz | |
| 2009/0037983 A1 | 2/2009 | Chiruvolu et al. | |
| 2009/0093300 A1 | 4/2009 | Lutnick et al. | |
| 2009/0119754 A1 | 5/2009 | Schubert | |
| 2009/0119776 A1 | 5/2009 | Palnitkar et al. | |
| 2009/0132813 A1 | 5/2009 | Schibuk | |
| 2009/0210712 A1* | 8/2009 | Fort | 713/175 |
| 2009/0235339 A1 | 9/2009 | Mennes et al. | |
| 2009/0249076 A1 | 10/2009 | Reed et al. | |
| 2009/0249077 A1 | 10/2009 | Gargaro et al. | |
| 2009/0254572 A1 | 10/2009 | Redlich et al. | |
| 2009/0259588 A1 | 10/2009 | Lindsay | |
| 2009/0259848 A1* | 10/2009 | Williams et al. | 713/168 |
| 2009/0265768 A1 | 10/2009 | Labaton | |
| 2009/0288159 A1 | 11/2009 | Husemann et al. | |
| 2009/0328168 A1 | 12/2009 | Lee | |
| 2010/0017860 A1 | 1/2010 | Ishida | |
| 2010/0024022 A1 | 1/2010 | Wells et al. | |
| 2010/0041391 A1 | 2/2010 | Spivey et al. | |
| 2010/0146611 A1* | 6/2010 | Kuzin et al. | 726/8 |
| 2010/0235897 A1 | 9/2010 | Mason et al. | |
| 2010/0242102 A1* | 9/2010 | Cross et al. | 726/7 |
| 2010/0250955 A1* | 9/2010 | Trevithick et al. | 713/185 |
| 2010/0262834 A1 | 10/2010 | Freeman et al. | |
| 2010/0268831 A1 | 10/2010 | Scott et al. | |
| 2011/0153496 A1 | 6/2011 | Royyuru | |
| 2011/0161989 A1 | 6/2011 | Russo et al. | |
| 2011/0208801 A1 | 8/2011 | Thorkelsson et al. | |
| 2012/0005483 A1 | 1/2012 | Patvarczki et al. | |
| 2012/0124651 A1* | 5/2012 | Ganesan et al. | 726/4 |

OTHER PUBLICATIONS

WOT [online]. Against Intuition Inc., 2006 [retrieved on Aug. 24, 2012]. Retrieved from the Internet: <URL: web.archive.org/web/20061127233933/http://www.mywot.com/en/wot/help/wot_symbols_explained/ >, pp. 1-3.*
International Search Report/Written Opinion, PCT/US2011/023525, mailed Apr. 5, 2011.
International Search Report/Written Opinion, PCT/US2011/022486, mailed Apr. 20, 2011.
International Search Report/Written Opinion, PCT/US2011/023528, mailed Apr. 27, 2011.
International Search Report/Written Opinion, PCT/US2011/032295, mailed Jun. 13, 2011.
International Search Report/Written Opinion, PCT/US2011/032271, mailed Jul. 11, 2011.
PCT International Search Report and Written Opinion issued in International Application No. PCT/US 11/22482 on Jan. 26, 2011.
International Search Report and Written Opinion, PCT/US2012/032840, Jun. 20, 2012.

* cited by examiner

METHOD FOR SECURE USER AND SITE AUTHENTICATION

RELATED APPLICATIONS

This application is a continuation of pending application Ser. No. 12/938,161, filed Nov. 2, 2010, and entitled "A NEW METHOD FOR SECURE SITE AND USER AUTHENTICATION", which claims priority based on Provisional U.S. Application Ser. No. 61/257,207, filed Nov. 2, 2009, and entitled "Project Seal", the contents of these applications being hereby incorporated herein in their entirety by reference.

TECHNICAL FIELD

This invention relates to security and privacy. More particularly it relates to site and user authentication.

BACKGROUND OF THE INVENTION

Fake web sites are frequently used to trick users into revealing confidential information. Site "seals" with a logo which the user associates with security help give users a sense of comfort when visiting a legitimate web site. This is analogous to a Better Business Bureau sticker in a physical storefront. However, on the web it is trivial for a fake site to copy such a seal. Trying to detect sites with such counterfeit seals and to then take down these sites is a slow process. Another alternative, having seals which require a user to click on them to verify authenticity expects users to be far more proactive and careful then they have proven to be. A somewhat more secure alternative is to install a toolbar that examines each page the user downloads and checks whether the source is a known malicious site. The disadvantage of this approach is that the user has to download and install a toolbar. Another approach that has proven not to work is the use of the SSL infrastructure wherein users are expected to navigate a maze of locks, green bars and frequent cryptic error messages, in order to ascertain the legitimacy of a site. When combined with the rise of man in the middle (MITM) and man in the browser (MITB) attacks, it is safe to say that current site authentication techniques on the web simply do not work.

The converse problem of user authentication to a web site is even more challenging. Most techniques for authentication like passwords and one time passwords are considered vulnerable to MITM and MITB attacks. Exacerbating the situation is the notion of single sign on or federation; namely the notion that one site will vouch for the authenticity of the user to several other sites. A single key to open several doors is certainly convenient, but if that one key is weak, then the risk has just been amplified.

The innovation described herein seeks to use a single approach to greatly increase the security of both site and user authentication.

OBJECTIVES OF THE INVENTION

This invention has the following objectives:
Develop a site authentication "seal" technique that is not easily defeated by counterfeit web sites, and which does not require the user to download and install a toolbar or to click on the seal to check its genuineness.
Develop a new method of user authentication based on one time passwords which crucially does not require the provisioning of a per user secret, but rather only requires a per relying web site shared secret.
Use the new methods of site and user authentication to achieve more secure and convenient single sign on.

Additional objects, advantages, novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

Our first innovation is to create a new method of site authentication that is not easily counterfeited. We achieve this by creating a pop-up window on the user's PC that is in communication with a security server, and where this communication channel is separate from the communication between the user's browser and whichever web site they are at. A legitimate web site embeds code in the web page which communicates to the security server from the user's desktop. The security server ensures the web site is not known to be malicious, and then signals both the web page on the user's browser, as well as the pop-up window to which it has a separate channel, that the web site is genuine. The 'signal' to the user can take the form of a visual cue conveying the concepts of "good site" or "bad site" or "do not know".

Our second innovation is to strengthen the security of the signaling mechanism described above by having the security server send a random image with the signal to both the pop-up window and the user's browser. The user who sees the image in both places gets further reassurance that the web site is safe.

Our third innovation ensures that counterfeiting the pop-up window is made very difficult by having the user select a personalization image which appears in the pop-up window. An attacker who tries to pop-up a fake window is foiled as they cannot know the personalization image.

Our fourth innovation is to have the user authenticate to the security server and use the signaling mechanism described above to communicate assertions about the user's identity to the web site, thus enabling single sign on for the user.

Our fifth innovation is to have the security server provide the user with a fresh one time password for authentication into the web site, where the one time password is constructed using a secret shared between the web site and the security server, obviating the necessity of maintaining a per user shared secret which is a requirement for previous one time password mechanisms.

PREFERRED EMBODIMENT(S) OF THE INVENTION

Figure 1:
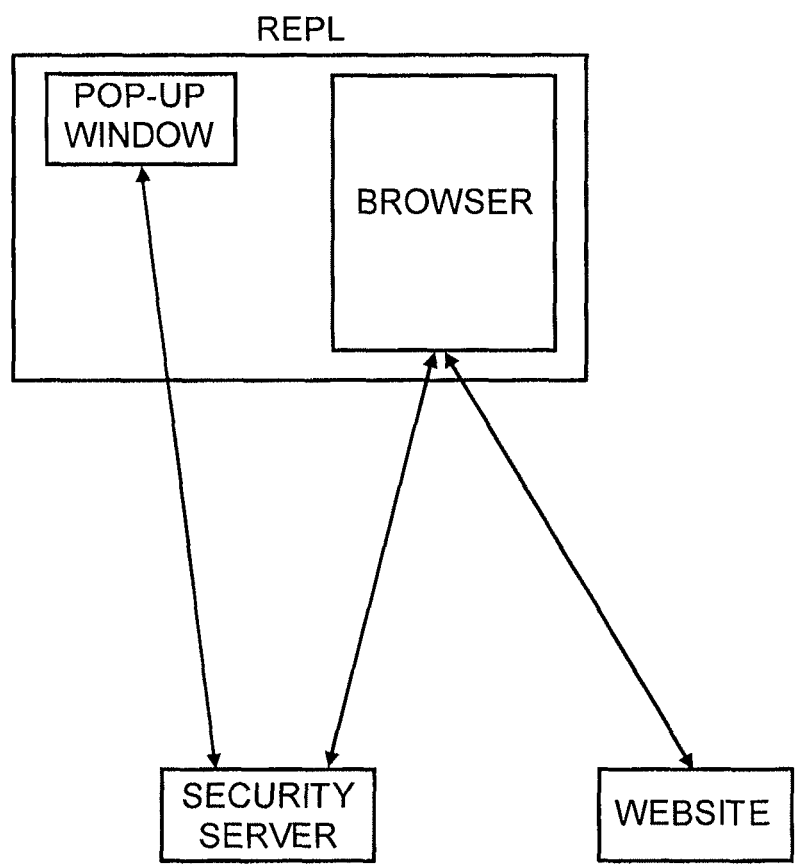
FIG. 1 depicts the main components of the system in accordance with the present invention.

We will first describe the preferred embodiment for site authentication and then describe how the system can be augmented to also perform user authentication. As shown in FIG. 1 the system consists of the following components:

A security server.
A pop-up window on the user's desktop.
A browser on the user's desktop.
The web site the user is browsing.

There are three distinct phases of operation: (i) the set-up and personalization of the pop-up window which is a one time process, (ii) the start-up of the pop-up window which happens at periodic intervals (akin to logging into a computer at each use), and (iii) The wake-up process when the user browses to a web site that can authenticate itself to the user using the security server.

For set-up the user visits a web site hosted at the security server and selects a personalization image. This image is stored locally on the user's PC using cookies, FLASH storage or similar local storage options. This is in general a one time event per user per PC, and only need be repeated if the user wants to change the personalization image, or the local storage is deleted for some reason.

Start-up occurs at periodic events. For instance this could happen once a day before the user begins browsing the web. The user can initiate the process manually, via a bookmark or bookmarklet, or by using the user's default web page mechanism. Alternately, there could be wake-up code which is triggered by the user visiting a web site that uses the system. Once the pop-up has been started it will be on the user's desktop occupying a relatively small amount of space. Typically the user will position the pop-up at a convenient location on their screen. The act of starting up the pop-up also results in the security server planting a local session object (for instance in a session cookie) on the user's PC.

A web site that wishes to participate in the system will embed on the page code to access the system. Typically this will be in the form of Javascript code within an iFrame. The code will reach out to the security server, an act that transfers to the security server, the previously planted session object. The security server checks the REFERRER or ORIGIN tag of the request from the iFrame against a known whitelist or blacklist of permitted/prohibited sites. It then responds to the iFrame and simultaneously signals the pop-up it is in communication with. The signal consists of two parts, first an indication of whether the web site is "good", "bad", or that the security server "does not know". The second part of the signal is a random image that is sent (if the site is legitimate) to the pop-up and to the iFrame. For a legitimate web site the user's pop-up will have a visual cue (e.g. a green light) that the web site is "good" and will show a random image. The iFrame will also show a similar visual cue and critically will also show the same random image. If the web site was on a black list the pop-up will show a visual cue (e.g. a red light) that indicates the site is "bad".

Attackers trying to defeat the system by creating a fake pop-up are thwarted because they will not know the personalization image. And, an attacker who tries to display the visual cue in the iFrame will not succeed as they do not know the random image that is sent to the pop-up. Finally, a counterfeit web site will not be able to manipulate the REFERRER or ORIGIN tag as it is inspected by the browser.

The communication between the pop-up and the security server can be implemented in a variety of ways. One approach would be to have the pop-up repeatedly make XHR requests with long time outs. Consequently whenever the security server has a need to send a message to the pop-up and simply opens to the currently open XHR request.

The system described above can be extended to communicate assertions about the user from the security server to the web server. We assume that the user, preferably during start-up, uses some method of authenticating to the security server. For instance the user could prove possession of credentials issued previously or use an out of band authentication technique to prove possession of a phone number. Once this has happened the security server is in a position to respond to requests for identity assertions from the web site. One way to achieve this would simply be for the web site to send the security server an assertion request, for instance via the request in the iFrame, and the security server can simply respond with the assertion. This request response could use the format of standards such as OpenID or SAML. This marries site authentication to user authentication (something that federation protocols like OpenID and SAML do not address) which provides significant security benefits.

Figure 2:
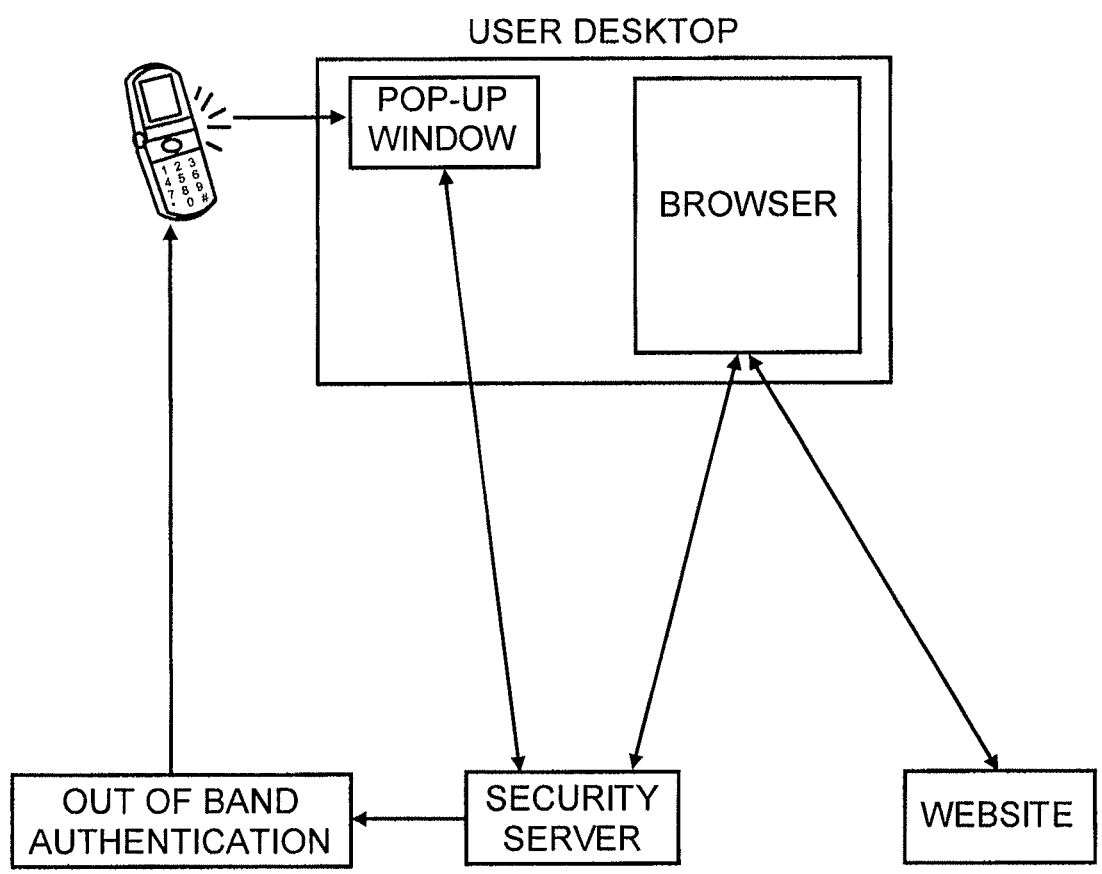
FIG. 2 shows the system augmented with user authentication, in this case achieved using out of band authentication, in accordance with the present invention.

A final innovation allows us to significantly strengthen the binding between the user, the security server acting as an Identity Provider and the web site which is the Relying Party. First, we assume that the security server and the web site have a priori agreed on a shared secret (the system is easily extended to use public key cryptography). Second, as shown in FIG. 2, we assume that the user has used some method, for instance out of band authentication, to authenticate to the security server. When the user is at a web site that requests authentication, and the web site communicates this request to the security server, the security server calculates a one time password as a function of the secret shared with the web site and some other information, and displays it to the user in the pop-up window. The user enters (perhaps by cutting and pasting) this one time password into the web site, which confirms authenticity by re-computing the one time password. This system has all the security properties of one time passwords, yet has the tremendous advantage that it does not require a shared secret with each user, and it is only the security server and the web sites that need shared secrets for the purpose of generating one time passwords. The actual one time password can be constructed based on a time stamp or a counter based OTP algorithm (in the way we use these algorithms the time or counter value needs to be communicated by the security server to the web site; or potentially computed deterministically using some agreed upon formula).

What is claimed is:

1. A method of authenticating a user on a network, comprising:

receiving, by a security server, a request of a network site for authentication of the user;

calculating, by the security server in response to the receipt of the authentication request, a one-time-password based on (i) a secret shared by the security server and the network site but not by the user, and the secret is not shared or associated by the security server or the network site with the user, and (ii) a one-time-password generating algorithm, wherein the one-time-password is independently calculable by the network site based on the shared secret and the one-time-password generating algorithm;

transmitting, by the security server to the network site, a time stamp or counter value associated with the calculated one-time-password; and transmitting, by the security server to the user, the calculated one-time-password to authenticate the user to the network site.

2. The method of claim 1, wherein:

the user is represented on the network by a user network device executing code embedded in a network page that is (i) associated with the network site and (ii) displayed by the user network device; and the authentication request is received from the user network device in accordance with the execution of the embedded network page code.

3. The method of claim 1, wherein:
the user is represented on the network by a user network device which displays a network page associated with the network site; and
the calculated one-time-password is transmitted, by the security server to the user network device for presentation on a window displayed by the user network device and entry by the user onto the displayed network page.

4. The method of claim 3, further comprising:
receiving, by a security server from the user network device, an identifier of the user network device and an identifier of the network site; and
transmitting, by the security server to the user network device in response to the receipt of the identifiers, an indication of legitimacy of the network site that will cause display of a corresponding legitimacy indicator on both the displayed network page and the displayed window.

5. The method of claim 4, further comprising:
determining, by the security server, the legitimacy of the network site based on the received network site identifier.

6. The method of claim 5, further comprising:
storing, by the security server on the user network device, a local session object;
wherein the received user network device identifier includes the stored local session object; and
wherein the received network site identifier includes a network address of the network site presented in the displayed network page.

7. The method of claim 4, wherein:
if the transmitted indication indicates that the network site is legitimate, the corresponding legitimacy indicator includes a first type visual cue in a first state; and
if the transmitted indication indicates that the network site is illegitimate, the corresponding legitimacy indicator includes the first type visual cue in a second state.

8. The method of claim 7, wherein:
the first type visual cue is a light;
the first state is green; and
the second state is red.

9. The method of claim 7, further comprising:
if the transmitted indication indicates that the network site is legitimate, the corresponding legitimacy indicator also includes a second type visual cue in the form of a random image.

10. An article of manufacture for authenticating a user on a network, comprising:
non-transitory processor readable storage medium; and
logic stored on the storage medium, wherein the stored logic is configured to be readable by a processor and thereby cause the processor to operate so as to:
receive a request of a network site for authentication of the user;
calculate in response to the receipt of the authentication request, a one-time-password based on (i) a secret shared by a security server and the network site but not by the user, and the secret is not shared or associated by the security server or the network site with the user, and (ii) a one-time-password generating algorithm, wherein the one-time-password is independently calculable by the network site based on the shared secret and the one-time-password generating algorithm;
transmit, to the network site, a time stamp or counter value associated with the calculated one-time-password; and
transmit the calculated one-time-password to authenticate the user to the network site.

11. The article of manufacture of claim 10, wherein:
the user is represented on the network by a user network device executing code embedded in a network page that is (i) associated with the network site and (ii) displayed by the user network device; and
the authentication request is received from the user network device in accordance with the execution of the embedded network page code.

12. The article of manufacture of claim 10, wherein:
the user is represented on the network by a user network device which displays a network page associated with the network site; and
the calculated one-time-password is transmitted to the user network device for presentation on a window displayed by the user network device and entry by the user onto the displayed network page.

13. The article of manufacture of claim 12, wherein the stored logic is further configured to cause the processor to operate so as to:
receive, from the user network device, an identifier of the user network device and an identifier of the network site; and
transmit, to the user network device in response to the receipt of the identifiers, an indication of legitimacy of the network site that will cause display of a corresponding legitimacy indicator on both the displayed network page and the displayed window.

14. The article of manufacture of claim 13, wherein:
the stored logic is further configured to cause the processor to operate so as to:
store, on the user network device, a local session object; and
determine the legitimacy of the network site based on the received network site identifier;
the received user network device identifier includes the stored local session object; and
the received network site identifier includes a network address of the network site included in the displayed network page.

15. The article of manufacture of claim 13, wherein:
if the transmitted indication indicates that the network site is legitimate, the corresponding legitimacy indicator will include a first type visual cue in a first state and a second type visual cue in the form of a random image; and
if the transmitted indication indicates that the network site is illegitimate, the corresponding legitimacy indicator will include the first type visual cue in a second state.

16. A system for authenticating a user on a network, comprising:
a communications port configured to receive a request of a network site for authentication of the user; and
a processor configured to calculate, in response to the receipt of the authentication request, a one-time-password based on (i) a secret shared by a security server and the network site, but not by the user, and the secret is not shared or associated by the security server or the network site with the user, and (ii) a one-time-password generating algorithm and to direct transmission of the calculated one-time-password and a time stamp or counter value associated with the calculated one-time-password to authenticate the user to the network site;

wherein the one-time-password is independently calculable by the network site based on the shared secret and the one-time-password generating algorithm.

17. The system of claim 16, wherein:
the user is represented on the network by a user network device executing code embedded in a network page that is (i) associated with the network site and (ii) displayed by the user network device; and
the authentication request is received from the user network device in accordance with the execution of the embedded network page code.

18. The system of claim 16, wherein:
the user is represented on the network by a user network device displaying a network page associated with the network site; and
the calculated one-time-password is transmitted to the user network device for presentation on a window displayed by the user network device and entry by the user onto the displayed network page.

19. The system of claim 18, wherein:
the communications port is further configured to receive, from the user network device, an identifier of the user network device and an identifier of the network site; and
the processor is further configured to direct transmission, to the user network device in response to the receipt of the identifiers, of an indication of legitimacy of the network site that will cause display of a corresponding legitimacy indicator on both the displayed network page and the displayed window.

20. The system of claim 19, wherein:
the processor is further configured to direct storage of a local session object on the user network device, and determine the legitimacy of the network site based on the received network site identifier;
the received user network device identifier includes the stored local session object; and
the received network site identifier includes a network address of the network site presented in the displayed network page.

21. The system of claim 19, wherein:
if the transmitted indication indicates that the network site is legitimate, the corresponding legitimacy indicator includes a first visual cue in a first state and a second visual cue in the form of a random image; and if the transmitted indication indicates that the network site is illegitimate, the corresponding legitimacy indicator includes the first visual cue in a second state.

22. A method of authenticating a user on a network, comprising:
receiving, by a first user agent on a user network device from a network site, a request of the network site for the user to be authenticated;
transmitting, by the first user agent to a security server, the network site request;
receiving, by a second user agent on the user network device from the security server in response to transmission of the network site request, a one-time-password calculated based on (i) a secret shared by the security server and the network site, but not by the user, and the secret is not shared or associated by the security server or the network site with the user and (ii) a one-time-password generating algorithm;
transferring the one-time-password from second user agent to first user agent; and
transmitting, by the first user agent to the network site, the one-time-password to authenticate the user to the network site;
wherein the one-time-password is independently calculable by the network site based on the shared secret and the one-time-password generating algorithm.

23. The method of claim 22, further comprising:
transmitting, by the first user agent to the network site, a request of the user to access the network site;
wherein the network site request is received in response to the transmitted user request.

24. The method of claim 22, wherein:
the first user agent is a network page that is associated with the network site and displayed on the user network device; and
the second user agent is a window displayed on the user network device.

25. The method of claim 24, wherein:
the network page has embedded code; and
the transmission of the network site request by the first user agent to the security server is based on execution of the embedded network page code by the user network device.

* * * * *